Oct. 13, 1931.  H. L. WALTER  1,826,849
HEMOGLOBINOMETER
Filed Aug. 12, 1927
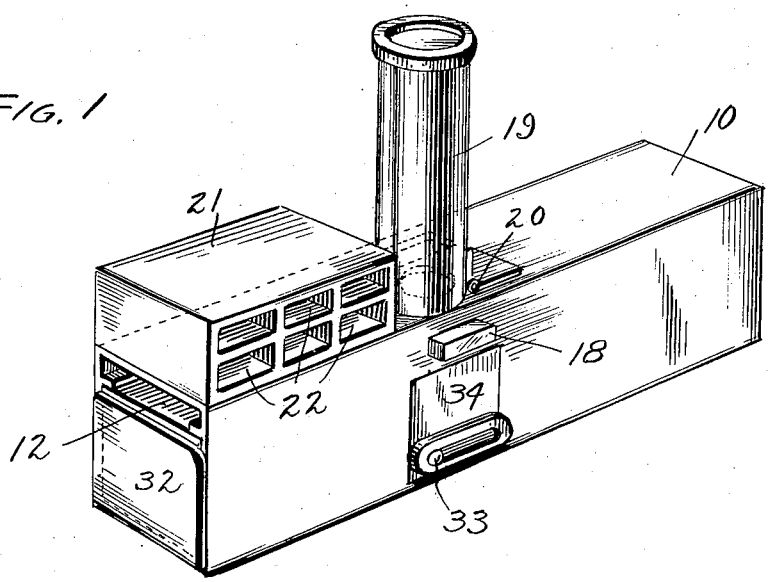
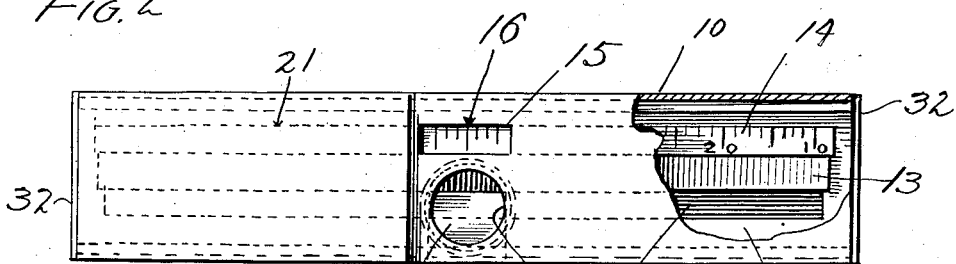
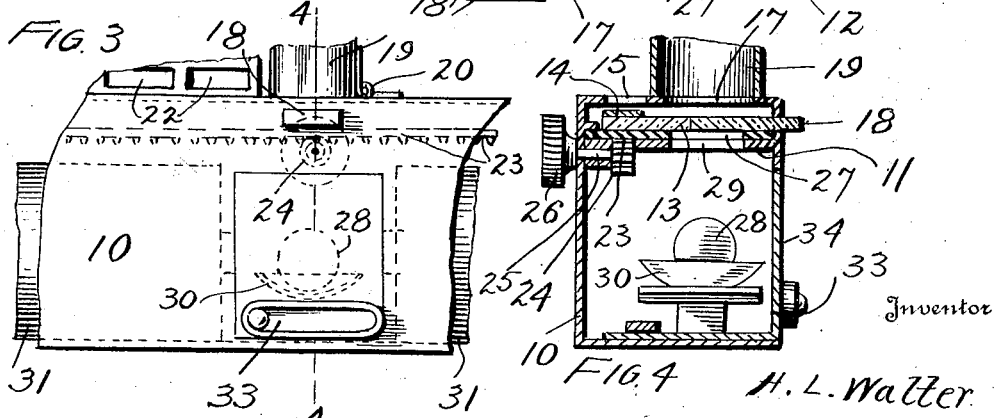
Inventor
H. L. Walter
By Chas. J. Williamson
Attorney Patented Oct. 13, 1931

1,826,849

UNITED STATES PATENT OFFICE

HENRY L. WALTER, OF TWIN FALLS, IDAHO, ASSIGNOR OF ONE-HALF TO HOWARD S. DE WITT, OF TWIN FALLS, IDAHO

HEMOGLOBINOMETER

Application filed August 12, 1927. Serial No. 212,600.

The object of my invention is to provide a hemoglobinometer which in what I consider the best embodiment of my invention at the present time will combine the qualities of accuracy in scale reading, facility for storage of a number of pipettes containing blood samples; compactness; and a unit or self-container as to the provision of lighting means.

My invention consists in whatever is described by or is included within the terms or scope of the appended claims.

In the drawings:

Fig. 1 is a perspective view of an instrument embodying my invention arranged for use;

Fig. 2 is a top plan view thereof with the telescope removed;

Fig. 3 is a side elevation or view of the central portion thereof;

Fig. 4 is a transverse section on the line 4—4 of Fig. 3.

Briefly describing the embodiment of the invention illustrated in the drawings, it comprises an oblong, flat-sided casing, a linear blood-standard and scale which are movable longitudinally of the standard below a centrally located opening through which the sample of blood or pipette to be examined is visible with a portion of the standard, the scale graduations being movable with reference to a fixed pointer or index also centrally located, a telescope mounted on the top of the casing and having a hinge connection therewith that permits it to be swung from a vertical position in alignment with the inspection hole to a prostrate position on the top of the casing, and illuminating devices comprising an electric lamp situated below the standard and pipette being examined, and which is supplied with current from a dry battery or cells in the casing, and storage compartments for pipettes on the top of the casing. Of course, the invention may be embodied in instruments which will not contain all of the features of construction just mentioned.

Describing in detail the instrument shown in the drawings, the oblong flat-sided casing, 10, is divided by a horizontal partition, 11, into upper and lower compartments, the upper compartment being shallow, and providing a guideway for a metal strip or long, narrow straight plate, 12, upon the upper side of which is mounted a straight glass or transparent bar, 13, colored to form the customary standard for blood comparison and a straight graduated strip or gauge, 14, the standard and the strip thus being linear, and hence, length of standard and scale provided greater than when such parts are made circular, and hence finer comparisons and indications are possible. The scale is exposed at midlength of the top of the casing through a sight opening, 15, which at one edge has a pointer or index, 16, and immediately adjacent such sight opening is a round opening, 17, in the casing top through which the portion of the standard below is visible, and such opening is of a size or diameter also to exhibit immediately adjacent the standard a pipette, 18, containing the sample of blood to be examined, so that sample, standard, and scale are immediately adjacent and all are in the top, or the same side, of the casing, so that immediately and without any movement the observer may at once by the scale read the value of the indication.

As usual a telescope or observation glass, 19, is provided and it is connected by a pivot or hinge 20, with the top of the casing adjacent the round sight opening, so that the telescope may be swung from a vertical position for use over the sight opening to one lying along or on the top of the casing, and thus the bulk of the instrument when not in use may be reduced and the danger of damage to the telescope is obviated which would be possible from knocks or blows should it extend, as in its reading position, at right angles to the casing. Upon the top of the casing opposite the telescope when in its prostrate position, is a box-like projection, 21, subdivided by horizontal and vertical partitions into pigeon-holes, 22, each adapted to hold a pipette, and thus provision is made for the convenient storage of pipettes. The height of said projection is substantially the diameter of the telescope, so that the parts of the apparatus are thus more or less symmetrically and compactly arranged.

For the convenient and close or nice longitudinal movement of the standard and gauge the carrier plate or strip, 12, has on its underside near one edge a rack bar, 23, which is engaged by a pinion, 24, on a transversely extending shaft, 25, which, on the side of the casing opposite the one having the opening for the insertion and removal of a pipette, has a milled head or button, 26, for turning. Preferably the opposite edges of the carrier plate, 12, are situated in guide grooves in the opposite sides of the casing above the partition, 11.

Below the standard, 13, the carrier, 12, has a longitudinally extending slot, 27, of a width transversely to be overhung on one side by the standard and by the pipette being inspected, so that the light from an electric lamp, 28, situated in the casing below the sight opening will shine at the same time through immediately adjoining portions of the standard and the pipette, and thus standard and blood sample immediately adjoining will be illuminated and may be seen under the most advantageous conditions for observation. Of course, the partition, 11, directly below the round sight opening, 17, has an opening, 29, for the passage of light from the lamp. The lamp preferably has a reflector, 30, and the current for the lamp is supplied by two cells, 31, contained in the larger, lower compartment of the casing, each being inserted through the casing end, and held in place, and so as to make proper circuit connections with the lamp, by a removable end wall, 32. A switch, 33, of ordinary construction is provided to open and close the lamp circuit, and the switch and the lamp socket and reflector are carried by a removable portion 34, of the side wall of the casing below the pipette inserting opening.

What is claimed is:

1. A hemoglobinometer having a casing and comparison means including a sight opening and a storage space for a plurality of pipettes projecting from one of the casing sides and having a telescope movably connected with the same side of the casing at its bottom and movable from a horizontal position alongside said storage space to a vertical position and being connected with the casing in both positions, the sight opening being situated between said projection and the point of connection of the telescope with the casing.

2. A hemoglobinometer having an elongated casing, a longitudinal partition dividing its interior into upper and lower compartments, a linear standard and linear scale edge to edge and slidable longitudinally in the upper compartment, an observation hole in the top of the upper compartment, sample support below said hole, and illuminating means in the lower compartment including a lamp below the sample support.

In testimony whereof I hereunto affix my signature.

HENRY L. WALTER.